(12) United States Patent
Rinka et al.

(10) Patent No.: US 6,429,244 B1
(45) Date of Patent: Aug. 6, 2002

(54) SELF-LEVELLING PLASTISOL COMPOSITION AND METHOD FOR USING SAME

(75) Inventors: Richard A. Rinka, Muskego; James F. Hubert, Brookfield, both of WI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/548,853

(22) Filed: Apr. 13, 2000

Related U.S. Application Data

(62) Division of application No. 09/224,919, filed on Jan. 4, 1999, now Pat. No. 6,103,309.
(60) Provisional application No. 60/072,236, filed on Jan. 23, 1998.

(51) Int. Cl.⁷ .................................................. C08K 5/01
(52) U.S. Cl. ...................................................... 524/186
(58) Field of Search ......................................... 524/186

(56) References Cited

U.S. PATENT DOCUMENTS

| | | |
|---|---|---|
| 3,252,820 A | 5/1966 | Vignolo et al. |
| 4,146,520 A | 3/1979 | Bierwirth et al. |
| 4,151,317 A | 4/1979 | Burba et al. |
| 4,268,548 A | 5/1981 | Burba et al. |
| 4,440,900 A | 4/1984 | Burba et al. |
| 4,533,524 A | 8/1985 | Burba et al. |
| 4,673,710 A | 6/1987 | Burba et al. |
| 4,851,464 A | 7/1989 | Wozniak |
| 4,900,771 A | 2/1990 | Gerace et al. |
| 4,959,399 A * | 9/1990 | Huynh-Tran ................. 523/437 |
| 5,032,432 A | 7/1991 | Huynh-Tran |
| 5,039,768 A | 8/1991 | Gerace et al. |
| 5,130,200 A | 7/1992 | Huynh-Tran |
| 5,143,650 A | 9/1992 | Gerace et al. |
| 5,160,628 A | 11/1992 | Gerace et al. |
| 5,205,963 A | 4/1993 | Brito et al. |
| 5,340,390 A | 8/1994 | Magauran et al. |

FOREIGN PATENT DOCUMENTS

| | | |
|---|---|---|
| EP | 0171850 | 2/1986 |
| EP | 212771 A1 * | 3/1987 |

* cited by examiner

*Primary Examiner*—Erma Cameron
(74) *Attorney, Agent, or Firm*—Stephen D. Harper; Michael E. Carmen

(57) ABSTRACT

A composition useful as a sealant in the automotive industry, particularly the paint shop area, is provided which comprises a plastisol, a wax and, optionally, a rheological additive, wherein the amount of wax exceeds the amount of rheological additive on a weight-by-weight basis. The composition will self-level during its application in the automobile assembly at a wide range of temperatures such that a smooth and uniform surface possessing no major imperfections is formed upon cooling of the composition.

16 Claims, 1 Drawing Sheet

SELF-LEVELLING PLASTISOL COMPOSITION AND METHOD FOR USING SAME

CROSS-REFERENCE TO RELATED APPLICATIONS

This application is a divisional application of U.S. Application Ser. No. 09/224,919, filed Jan. 4, 1999, now U.S. Pat. No. 6,103,309, which claims priority from U.S. Provisional Application Ser. No. 60/072,236, filed Jan. 23, 1998, the disclosure of which is incorporated herein by reference.

BACKGROUND OF THE INVENTION

This disclosure relates generally to a self-levelling plastisol composition. More specifically, the plastisol composition described herein contains a polymeric resin such as PVC, a plasticizer, a wax and, optionally, a rheological additive, wherein the amount of wax exceeds the amount of rheological additive on a weight-by-weight basis. Methods for its use as a sealant in the automotive industry are also described.

Plastisols are widely used in many industrial processes as adhesives and sealers. See, e.g., U.S. Pat. Nos. 4,146,520; 4,151,317; 4,268,548; 4,440,900; 4,533,524; 4,673,710; 4,851,464; 4,900,771; 5,032,432; 5,039,768; 5,130,200; 5,143,650; 5,160,628, and 5,205,963; and European Patent App. No. 171,850. In general, adhesives are employed to bind various substrates together while sealants are employed to produce load bearing elastic joints between two or more surfaces and to prevent the passage of air, water and dirt therethrough. The automotive industry, in particular, is a major user of both the adhesives and sealants. Automobiles are assembled from several structural components which are joined together in various fashions depending on particular components and the degree of stress that will have to be endured. For certain assembly steps an adhesive composition is applied as a liquid and subsequently hardened To provide sufficient bonding strength. For example, adhesives are utilized in the assemblies of door panels, quarter panels, tailgates and roofs. These same assemblies will typically employ sealant compositions at a later stage in the assembly line. Still other automobile assemblies which are welded or bolted together use sealant compositions in their seams. The wheel house, shock lower, rocker panel, firewall, floor hem flange, floorplan, and trunk are a few examples of where sealants, but not adhesives, are employed.

Typically, automobile body assembly lines contain separate body shop and paint shop areas where adhesives and sealants are individually employed in each respective area. Adhesive compositions applied in the body shop area can be high strength epoxy or modified-epoxy adhesives which are capable of bonding to oily galvanized steel. In some cases, vinyl plastisols can be employed, however, these applications are normally limited to situations that do not require high bonding performance. In any case, these materials are applied at room temperature and later cured through exposure to heat. In order to apply these materials, they must be of low enough viscosity to be mechanically pumped with adequate flow rates. Normally, because of their low viscosity these materials are easily displaced when exposed to liquid impingement by various cleaning solutions (washes) to which the assembly body parts are exposed. Once the assembled pans are moved from the body shop area to the paint shop area, they are subjected to sealing, painting, and final oven curing. Sealant compositions have been found to have those needed characteristics.

Plastisols have been employed as sealants in the paint shop area of the body assembly line. The plastisols adhere well to primed metal surfaces and can be painted over. They are durable enough to withstand normal weather and user exposure. Another important quality of the plastisols is that they are not expensive. In general, plastisols, are dispersions of polymeric resins in plasticizers. Examples of such polymeric resins include poly(vinyl chloride), poly(vinyl acetate) and copolymers of vinyl chloride and vinyl acetate. Other polymers can be employed as well in the preparation of plastisols.

Plasticizers are high boiling liquids which attack and plasticize the polymeric resin particles. The plastisols arc liquids which are applied at room temperature to the substrate. The liquid is convened to a solid through exposure to heat. In effect, the heat causes the dispersed resin particles to fuse together or dissolve into the plasticizer. A solid product results upon subsequent cooling.

Waxes have been employed in plastisol compositions but typically in combination with rheological additives, e.g., thixotropic agents such as precipitated calcium carbonates, silicas and clay derivatives. Examples of such waxes include amorphous waxes, carnauba waxes, castor oil waxes and synthetic waxes. In general, the weight ratio of wax to rheological additive employed in plastisol compositions have ranged from about 1:2 to about 1:20.

One problem associated with the use of a plastisol having the wax to rheological additive ratio in the aforestated range is that during the application of the plastisol as a sealant in the paint shop area, it does not flow evenly, i.e., self-level, to provide a smooth finish. Referring to FIG. 1a, the plastisol is initially applied as a thick material 10 at room temperature to fill seam 30 of substrate 20 and/or body joints which must be sealed. As the temperature is increased, the plastisol exhibits limited flow characteristics due to the large amount of rheological additive as compared to the amount of wax. Thus, as depicted in FIG. 1b, when the applied plastisol 10 on substrate 20 is painted over, major imperfections such as tack, run-offs, bumps, ridges, etc. are visually apparent.

SUMMARY OF THE INVENTION

It is an object of the present invention to provide a plastisol composition that self-levels when applied as a sealant at a wide range of application temperatures.

It is a further object of the present invention to provide a plastisol composition which flows evenly at elevated temperatures to provide an extremely smooth finish which exhibits no major imperfections.

In keeping with these and other objects of the present invention, a plastisol composition which exhibits excellent self-levelling properties over a wide range of elevated temperatures is provided which comprises a plastisol, a wax and, optionally, a rheological additive, wherein the amount of wax exceeds the amount of rheological additive on a weight-by-weight basis.

The plastisol composition comprising at least one plastisol, a wax and, optionally, a rheological additive, wherein the amount of wax exceeds the amount of rheological additive on a weight-by-weight basis is applied to a substrate is a sealant at room temperature and then heated to an elevated temperature ranging from about 95° C. to about 200° C. to obtain a coating exhibiting no major imperfections.

The terms "self-level" and "self-levelling" as used herein shall be understood as referring to the ability of the plastisol composition to flow from a wide variety of shapes to provide a substantially smooth and uniform surface at elevated temperatures.

DETAILED DESCRIPTION OF THE PREFERRED EMBODIMENTS

The plastisol composition of this invention is obtained by mixing at least one plastisol, a wax in an amount sufficient to render the plastisol composition self-levelling over a wide temperature range and, optionally, a rheological additive, wherein the amount of wax exceeds the amount of rheological additive on a weight-by-weight basis. This composition is based on the surprising discovery that the addition of a wax in amounts that substantially exceed that of a rheological additive on a weight-by-weight basis will enable the plastisol composition of this invention to self-level during its application as a sealant when temperatures are elevated thereby allowing the composition to form a level surface, i.e., a surface which is substantially smooth and uniform, upon cooling to room temperature.

Figure 1A:
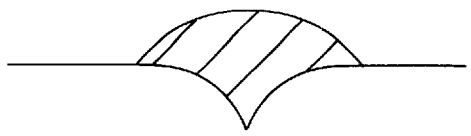
FIG. 1a is an illustration of a prior art plastisol composition applied at room temperature.
Figure 1B:
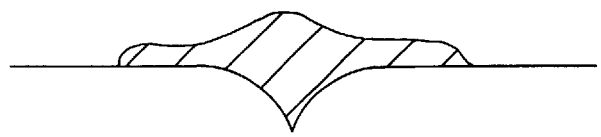
FIG. 1b is an illustration of the prior art plastisol composition cooled to room temperature after being heated at elevated temperatures with the composition forming ridges therein.
Figure 2A:
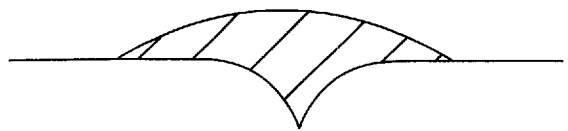
FIG. 2a is an illustration of the plastisol composition of this invention as applied at room temperature; and, FIG. 2b is an illustration of the plastisol composition of FIG. 2a cooled to room temperature after being heated at elevated temperatures with the composition forming a level surface.
Figure 2B:
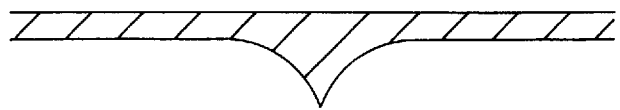

Referring to FIG. 2a, when initially applied to a substrate 200 in, e.g., seam 300, at room temperature, a plastisol composition 100 containing a plastisol, a wax and, optionally, a rheological additive will be a thick material possessing a high thixotropic index. When at room temperature, the viscosity of the plastisol composition will ordinarily range from about 10,000 cps to about 400,000 cps. Once the temperature is elevated, e.g., to a temperature of from about 20° C. to about 90° C., the wax will melt such that the viscosity of the whole material, e.g., from about 4,000 cps to about 300,000 cps, is lowered thereby allowing the material to flow into a self-levelling position. While not wishing to be bound by theory, it is believed that as the temperature is further elevated, e.g., to a temperature of from about 95° C. to about 200° C., the gel point of the plastisol is reached thereby fusing the plastisol composition into a hard mass with the wax being internalized within the hard mass as a liquid. Upon cooling, the wax will return to its solid form together with the larger mass. The plastisol composition 100, as depicted in FIG. 2a forms a level surface possessing no major imperfections on substrate 200. In contrast, the plastisol composition of the prior art forms a surface possessing major imperfections such as tack, run-offs, bumps, ridges, etc. which are visually apparent. (See FIG. 1b.)

In general, the plastisols employed in the composition of the present invention comprises finely divided polymeric resin particles dispersed in a plasticizer. The polymeric resins are well known in the an and have been widely used in plastisol compositions. Suitable polymeric resins for use herein include polyvinyl chloride resins, polyvinyl acetate resins, copolymers of vinyl chloride with vinyl addition monomers such as, for example, vinyl acetate, the vinyl acetals, maleic esters, styrene, vinylidene chloride and acrylonitrile. Particularly preferred polymeric resins are the polyvinyl chloride homopolymers. Blends of several different polymeric resins can also be used and will also be referred to as the polymeric resin, even though more than one resin may actually be present. Generally, a blend of from about 50 to about 100 percent and most preferably from about 60 to about 75 percent of a homopolymer dispersion resin can be used herein.

Plasticizers useful in the production of the plastisol include monomeric types selected to achieve desired characteristics such as proper gelation, fusion, and flow properties. Examples of such monomeric plasticizers include monomeric esters of phthalic, benzoic, succinic, adipic, sebacic, talic, lauric, azelaic, caprylic, hexanoic, phosphoric, oleic, glutaric, trimellitic and stearic acids. Specific plasticizers include dioctyl phthalate, ethylene glycol dibenzoate, dioctyl succinate, dibutyl sebacate, dibenzyl azelate, didecyl glutarate and similar compounds. Other monomeric plasticizers include esters (particularly benzoate and isobutyrate esters) of irimethylpenranediols such as 2,2,4-trimethyl-1, 3-pentanediol, citric acid esters and n-ethyl toluenesultonaride. A preferred plasticizer for use herein is diisodecyl phthalate.

Polymeric plasticizing agents can be used in conjunction with the monomeric plasticizers in order to achieve special characteristics such as permanence, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic, and stearic acids, including mixtures or blends of these compounds. The polymeric plasticizers ordinarily have low diffusion rates because of their higher molecular weights and also act to retard the migration of other components from the applied compositions. Additionally, low molecular weight chlorinated paraffinic oils and epoxidized soybean oil can be used as co-plasticizers. Blends of several different plasticizers can be used, but will be referred to simply as the plasticizer.

The foregoing plastisol is blended with a wax to provide the plastisol composition of this invention. Suitable waxes for use herein include amorphous wax, beeswax, carnauba wax, castor wax, spermaceti wax, vegetable wax, candelilla wax, japan wax, ouricury wax, douglas-fir bark wax, ricebran wax, jojoba wax, bayberry wax, montan wax, peat wax, ozokerite wax, ceresin wax, petroleum wax, paraffin wax, polyethylene wax, fischer-tropsch wax, chemically modified hydrocarbon wax and substituted amide wax. A presently preferred wax is castor wax.

Castor wax is a synthetic wax-like compound obtained by the controlled hydrogenation of natural castor oil. The principal constiwuent is the glyceride of 12-hydroxystearic acid. There can also be present minor quantities of mixed glycerides of this acid as well dihydroxystearic and stearic acids. In general, castor wax has been employed in plastisol compositions in amounts of on the order of less than about 2 percent by weight of the composition. The castor wax used herein can be any known castor oil derivative. Castor oil derivatives are disclosed in U.S. Pat. No. 5,340,390, the contents of which are incorporated by reference herein. Suitable castor oil derivatives include those derivatives commercially available from EEC Americas Inc. (Gonzales, Tex.), e.g., Flowtone R, Flowtone GR, Flowtone ST, Flowtone GST, Flowtone 4 and the like, and from National Lead (NL Chemicals) (Hightstown, N.J.), e.g., Thixcin and the like.

The composition of this invention will ordinarily range from about 5 to about 40 weight percent of the finely divided polymeric resin, from about 5 to about 50 weight percent of the plasticizer, and from about 0.1 to about 20 weight percent of the wax preferably from about 10 to about 30 weight percent of the finely divided polymeric resin, from about 15 to about 40 weight percent of the plasticizer and from about 2 to about 10 weight percent of the wax and more preferably from about 15 to about 25 weight percent of the polymeric resin, from about 25 to about 35 weight percent of the plasticizer and from about 3 to about 8 weight percent of the wax.

Optionally, rheological additives such as thixotropic agents, e.g., precipitated calcium carbonates, silicas, clay derivatives and the like, can be used herein. Since rheological additives generally inhibit the flow characteristics of materials, i.e., the additives would prevent the composition of this invention from flowing at elevated temperatures where the composition ordinarily begins to flow and then subsequently self-levels, it is particularly advantageous to employ no rheological additive in the composition. However, when employing a rheological additive in the composition used herein, the amount of wax must exceed the amount of the rheological additive on a weight-by-weight basis. Preferably, the weight ratio of wax to rheological additive will be at least about 2:1, more preferably at least about 5:1 and most preferably at least about 10:1.

The composition of this invention can also include optional components such as adhesion promoters, e.g, polyamide resins, methacrylates, epoxies, phenolic resins, silanes and the like; fillers, e.g., ground calcium carbonate, calcium sulfate, calcium oxide, magnesium oxide, titanium oxide, zinc oxide, diatomaceous earth, and the like; pigments, e.g., carbon black, titanium dioxide and the like; wetting agents e.g., polyethylene glycol derivatives and the like, oil-absorbing substances, e.g., diatomaceous earth and the like, tackifiers, e.g., nitrile rubber, styrene butadiene copolymers, resin esters, terpene resins, and the like, and solvents, e.g., mineral spirits, xylene, toluene, and the like. It is to be understood that the optional components employed herein will ordinarily not possess any thixotropic properties. In general, the amount of these optional components will vary from about 0 to about 70 weight percent and preferably from about 30 to about 60 weight percent of the composition.

The PVC plastisol composition of this invention is paticularly useful as a sealant in the assembly of automotive bodies. Thus, the composition of this invention can be used in the paint shop area of the assembly and is applied to a substrate. For example, the composition can be used for substrates such as metal assemblies of door panels, quarter panels, tailgates and roofs that leave the body shop area. Additionally, the sealant composition can be used for other automobile assemblies which are welded or bolted together and use the sealant compositions in their seams. Such assemblies include substrates such as the wheel house, shock tower, rocker panel, firewall, floor hem flange, floorplan and trunk. In general, the sealant composition can be applied to any of the foregoing substrates at room temperature in any convenient manner, such as pumping, troweling, flowing, brushing or spraying, either manually or robotically. Once applied, the sealant composition will self-level as the temperature is increased as described hereinabove. Upon cooling, the seaant composition hardens to a state with an initial degree of sealing which is adequate for the intended purpose.

Subsequent to the priming step, if one is used, and prior to an oven bake, the body shell is top coated with a paint and oven baked to a totally cured state by plastisol fusion of the sealer and also the top coat paint. The fusion temperature is well above the aforementioned application temperature. The applied composition of this invention is also able to withstand these operations without causing cosmetic-type problems such as discoloration, tackiness, cracking, etc. After the sealant composition is painted over, the final product will have a smooth finish with no major imperfections, e.g, ridges or bumps, where the sealant was applied.

The following examples are illustrative of this invention.

EXAMPLE 1

The following plastisol composition is a high bake material formulated to flow evenly in high temperature sealer ovens.

To a sigma blade mixer, a mixture of 500 g of diisodecyl phthalate, 1050 g of Q-325 (a coarse ground calcium carbonate passed through a 325 mesh screen) which is commercially available from J. M. Huber (Quincy, Ill.), and 105 g hydrogenated castor wax known as Flowtone R which is commercially available from LaPorte/Southen Clay (Gonzales, Tex.) was added with cold waler. After mixing was commenced, 300 g KV-2 (a homopolymer dispersion PVC resin with a relative viscosity of 2.60–2.70) which is commercially available from Formosa Plastics Corporation (Delaware City, Del.), 150 g Vinyeel 100×122 (a homopolyvmer blend PVC resin) which is commercially available from Shawnee Chemical Company (Plainsboro, N.J.), 37.5 g CaO and 22.5 g Surfac 555 (a proprietary polyamide) which is commercially available from Shell (Houston, Tex.) were added to the mixture. The mixing was continued under vacuum for a period of 15 minutes.

Next, 75 g diisodecyl phihalate and 75 g odorless mineral spirits were combined and then added slowly to the mixture to avoid any lumping. The mixture was mixed under vacuum for a period of 15 minutes to provide the PVC plastisol composition.

EXAMPLE 2

The plastisol composition of Example 1 was applied to electrodeposition coated metal panels as a sealant. The temperature was then increased to about 40° C. and the sealant began to flow. The temperature was further increased until the sealant reached a level form at 170° C. The sealant was then cooled until it reached room temperature. The electrodeposition coated metal panels were then painted over with the area where the sealant was applied possessing a smooth surface.

Although the present invention has been described in preferred forms with a certain degree of particularity, many changes and variations are possible therein and will be apparent to those skilled in the an after reading the foregoing description. It is therefore to be understood that the present invention may be practiced otherwise than as specifically described herein without departing from the spirit and scope thereof.

What is claimed is:

1. A self-levelling sealant composition comprising
   at least one plastisol;
   a wax; and
   a rheological additive, wherein the amount of wax exceeds the amount of rheological additive on a weight-by-weight basis.
2. The composition of claim 1 wherein the rheological additive is a thixotropic agent.

3. The composition of claim 2 wherein the thixotropic agent is selected from the group consisting of precipitated calcium carbonates, silicas and clay derivatives.

4. The composition of claim 1 wherein the plastisol comprises a polymeric resin and a plasticizer.

5. The composition of claim 4 wherein the polymeric resin is selected from the group consisting of poly(vinyl chloride), poly(vinylacetate), copolymers of vinyl chloride and vinyl acetate and mixtures thereof.

6. The composition of claim 4 wherein the plasticizer is selected from the group consisting of monomeric esters of phthalic, benzoic, succinic, adipic, sebacic, talic, lauric, azelaic, caprylic, hexanoic, phosphoric, oleic, glutaric, trimellitic, and stearic acids, N,N-dimethyl oleoamide, oleyl nitride, N-ethyl toluenesulfonamide, isobutyrate and benzoate esters of trimehypentanediols, polymeric esters of succinic, adipic, sebacic, talic, lauric, azelaic, caprylic, hexanoic, benzoic, phthalic, phosphoric, oleic, glutaric, trimellitic, and stearic acids, and mixtures thereof.

7. The composition of claim 1 wherein the wax is selected from the group consisting of amorphous wax, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, fischer-tropsch wax, chemically modified hydrocarbon wax and substituted amide wax.

8. The composition of claim 1 wherein the wax is castor wax.

9. The composition of claim 1 wherein the plastisol represents from about 10 to about 90 weight percent of the composition.

10. The composition of claim 1 wherein the amount of wax represents from about 0.1 to about 20 weight percent of the composition.

11. The composition of claim 8 wherein the amount of castor wax represents from about 0.1 to about 20 weight percent of the composition.

12. The composition of claim 4 wherein the polymeric resin represents from about 5 to about 40 weight percent and the plasticizer represents from about 5 to about 50 weight percent of the composition.

13. The composition of claim 1 wherein the weight ratio of wax to rheological additive is at least about 2:1.

14. The composition of claim 1 wherein the weight ratio of wax to rheological additive is at least about 5:1.

15. The composition of claim 1 further comprising optional components selected from the group consisting of adhesion promoters, fillers, pigments, tackifiers, solvents, oil-absorbing substances and mixtures of one or more thereof.

16. The composition of claim 15 wherein the optional components represent 0 to about 70 weight percent of the composition.

* * * * *